(12) United States Patent
Wang

(10) Patent No.: US 9,577,847 B2
(45) Date of Patent: Feb. 21, 2017

(54) NON-RECIPROCAL COMPONENTS WITH BALANCED DISTRIBUTEDLY MODULATED CAPACITORS (DMC)

(71) Applicant: THE REGENTS OF THE UNIVERSITY OF CALIFORNIA, Oakland, CA (US)

(72) Inventor: Yuanxun Ethan Wang, Manhattan Beach, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days.

(21) Appl. No.: 14/857,885

(22) Filed: Sep. 18, 2015

(65) Prior Publication Data
US 2016/0087823 A1    Mar. 24, 2016

Related U.S. Application Data

(60) Provisional application No. 62/052,228, filed on Sep. 18, 2014.

(51) Int. Cl.
*H04L 27/00* (2006.01)
*H04L 25/02* (2006.01)
*H04B 1/525* (2015.01)

(52) U.S. Cl.
CPC ......... *H04L 25/0272* (2013.01); *H04B 1/525* (2013.01)

(58) Field of Classification Search
CPC ............ H04L 25/0272; H04L 27/0002; H03H 7/0138; H01P 5/18
See application file for complete search history.

(56) References Cited

U.S. PATENT DOCUMENTS

| 4,434,397 A | * | 2/1984 | Nelson | G01R 29/10 324/611 |
| 2010/0289598 A1 | * | 11/2010 | Cheung | H01P 1/387 333/109 |
| 2013/0201882 A1 | * | 8/2013 | Bauder | H03H 7/48 370/277 |
| 2014/0248837 A1 | * | 9/2014 | Zhou | H04B 1/0458 455/41.2 |

(Continued)

OTHER PUBLICATIONS

Shihan Qin, and Yuanxun Ethan Wang, Parametric Conversion with Distributedly Modulated Capacitors (DMC) for Low-Noise and Non-Reciprocal RF Front-Ends, University of California, Jun. 2-7, 2013, IEEE.*

(Continued)

*Primary Examiner* — Aristocratis Fotakis
(74) *Attorney, Agent, or Firm* — O'Banion & Ritchey LLP; John P. O'Banion

(57) ABSTRACT

A non-reciprocal radio frequency transceiver front end utilizing multiple time-varying transmission lines (TVTLs) implemented using distributed modulated capacitors (DMC) to exploit time-varying properties of transmission line structures to isolate the transmit and receive signals. The TVTLs are coupled at an input side to an antenna and ground through a first 90 degree coupler, and the outputs of the TVTLs are coupled through a second 90 degree coupler for connection to a receiver and transmit circuit, respectively. The apparatus allows simultaneously operating a transmitter and receiver sharing a single antenna (or single antenna array).

21 Claims, 8 Drawing Sheets

(56) References Cited

U.S. PATENT DOCUMENTS

| | | | |
|---|---|---|---|
| 2015/0097031 A1* | 4/2015 | Yang | H04B 5/0031 |
| | | | 235/439 |
| 2015/0102869 A1* | 4/2015 | Wang | H01P 1/36 |
| | | | 333/1.1 |
| 2016/0020733 A1* | 1/2016 | Kaehs | H03F 3/245 |
| | | | 330/262 |

OTHER PUBLICATIONS

Shihan Qin, "A Non-Reciprocal Component with Distributedly Modulated Capacitors", Thesis, MSc in Electrical Engineering, UCLA, 2013.*

Yuanxun Ethan Wang , Time-Varying Transmission Lines (TVTL)—A New Pathway to Non-Reciprocal and Intelligent RF Front-Ends,University of California at Los Angeles, Jan. 2014, IEEE.*

Wang, Y. Ethan, Non-Reciprocity With Time-Varying Transmission Lines (TVTLs), 2012 IEEE International Conference on Wireless Information Technology and Systems (ICWITS), Nov. 11-16, 2012, pp. 1-4.

* cited by examiner

NON-RECIPROCAL COMPONENTS WITH BALANCED DISTRIBUTEDLY MODULATED CAPACITORS (DMC)

CROSS-REFERENCE TO RELATED APPLICATIONS

This application claims priority to, and the benefit of, U.S. provisional patent application Ser. No. 62/052,228 filed on Sep. 18, 2014, incorporated herein by reference in its entirety.

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND

1. Technological Field

This technical disclosure pertains generally to isolating transmitting and receiving channels in a radio receiver front end, and more particularly to utilizing transistor circulators for isolating transmitter and receiver channels.

2. Background Discussion

Separating the transmitting and receiving channels connected to a single antenna is currently realized utilizing circulators which are often made of non-reciprocal magnetic material, such as ferrite. These circulators are not compatible with standard integrated circuit processing and can only provide suitable performance over a relatively narrow frequency band. Circulators based on optical links can provide broadband performance, however, they are also too physically bulky for integration on-chip.

As an alternative, active circulators based on transistor amplifiers have been developed, yet these add noise in the receiver and limit the maximum operating power of the transmitter.

A previous solution from the inventor ("Parametric conversion with distributed modulated capacitors (DMC) for low-noise and non-reciprocal RF front-ends", S. Qin and Y. E. Wang, 2013 IEEE International Microwave Symposium, Seattle, June, 2013.) overcome the above problems, while it was limited to a maximum isolation of 13 dB over a broad bandwidth.

Accordingly, a need exists for a method and apparatus for separating the transmitting the receiving channels within a radio frequency front end which provides deeper levels of isolation and can be incorporated into integrated circuitry.

BRIEF SUMMARY

A non-reciprocal radio frequency receiver front end apparatus which can be realized using standard single or multilayer printed circuits without the need of magnetic material. This front end circuit can thus be integrated on the same chip with other electronic elements to offer significant advantages in terms of size and production cost. The apparatus can be designed to operate over a broad bandwidth with nominal constraint to transmitter power, while minimizing receiver noise. In addition, the balanced structure offers significant isolation levels over a broad bandwidth.

The technology may be implemented (fabricated) in various ways, such as utilizing state of the art integrated circuit technology including Monolithic Microwave Integrated Circuit (MMIC) or Radio Frequency Integrated Circuit (RFIC), with their respective applications to high-performance microwave and millimeter wave radio systems. The disclosed method provides a broadband approach for simultaneously operating a transmitter and receiver.

The disclosed technology offers the ability to realize non-reciprocal components, such as circulators, capable of operating over a broad bandwidth and which can be manufactured utilizing standard integrated circuit processes. It is expected that this approach will lead to the development of integrated electronics capable of simultaneous transmitting and receiving through the same antenna at the same time and over the same frequency.

Examples of commercial applications include compact radar systems, miniaturized radios such as cell phones and high performance RFID readers. The technology can provide a way to enhance the transceiver isolation and improve the robustness and the signal to interference and noise performance of the receiver.

Further aspects of the presented technology will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The disclosed technology will be more fully understood by reference to the following drawings which are for illustrative purposes only:

DETAILED DESCRIPTION

1. Non-Reciprocal Components with Balanced DMC.

Non-reciprocity in passive networks necessitates the usage of non-reciprocal material such as ferrite based magnetic material. The distributed modulated capacitors (DMC) utilized herein exploit the time-varying property of transmission line structures for an additional degree of freedom in designing non-reciprocal components.

The theory of an infinitely long transmission line whose reactance is time-varying are described here to illustrate the underlying operating principle of the time-varying transmission line nonreciprocity.

Figure 1:
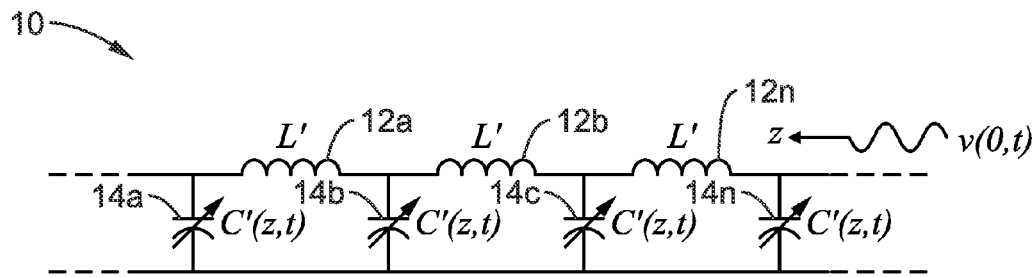
FIG. 1 is a schematic diagram of a lumped circuit model for a lossless infinite transmission line with time-varying capacitance, according to an embodiment of the present disclosure.

FIG. 1 illustrates an example 10 of a lumped-element circuit model for a lossless infinite transmission line with time-varying capacitance. Inductors $12a$, $12b$, through $12n$ are seen in series on the transmission line with a plurality of interspersed time-varying shunt capacitors $14a$, $14b$, $14c$ through $14n$, which are coupled between the two transmission lines.

In the following Telegrapher's equations are modified to include the time variation of the capacitance per unit length:

$$\frac{\partial v(z,t)}{\partial z} = -L'\frac{\partial i(z,t)}{\partial t}, \quad (1\text{-}1)$$

$$\frac{\partial i(z,t)}{\partial z} = -\frac{\partial [C'(z,t)v(z,t)]}{\partial t}. \quad (1\text{-}2)$$

where L' and C' are inductance and capacitance per unit length, respectively. Rearranging the equations in Eq. (1-1 and 1-2) yields $$\frac{\partial^2 v(z,t)}{\partial z^2} = L'\frac{\partial^2 [C'(z,t)v(z,t)]}{\partial t^2}. \quad (2)$$

When the capacitance is modulated by a single-tone carrier wave traveling in the +z direction at the angular frequency $\omega_m$, the capacitance per unit length under the linear modulation assumption can be written in a general form as $$C'(z,t) = C'_0 + C'_m \cos(\omega_m t - \beta_m z + \phi_m), \quad (3)$$

where $C'_0$ is the mean capacitance per unit length, $C'_m$ is the amplitude of the capacitance variation per unit length, $\beta_m$ is the phase constant of the carrier with a phase velocity of $v_p = \omega_m/\beta_m = 1/\sqrt{L'C'_0}$. It should be appreciated that aside from controlling capacitance, the carrier wave does not otherwise carry information. It is assumed that the carrier behaves as a pump signal with uniform amplitude along the transmission line, which drives the time-variation of the transmission line capacitance in a traveling wave fashion.

Conversely, a signal wave is launched into the same transmission line propagating toward the +z direction at the angular frequency $\omega_s$. The signal is mixed up and down with the capacitance modulation signal at the angular frequency $\omega_m$, generating various harmonic and intermodulation terms. As the modulation frequency is normally chosen to be greater than the signal frequency ($\omega_m > \omega_s$), one can limit the discussions to three major tones: the input tone $\omega_s$ and both sidebands of the carrier, $\omega_{m-s} = \omega_m - \omega_s$ and $\omega_{m+s} = \omega_m + \omega_s$. Assume the variation of the capacitance is small and the transmission line is non-dispersive over the bandwidth interested:

$$\frac{\omega_s}{\beta_s} = \frac{\omega_{m-s}}{\beta_{m-s}} = \frac{\omega_{m+s}}{\beta_{m+s}} = \frac{\omega_m}{\beta_m} = v_p = \frac{1}{\sqrt{L'C'_0}}. \quad (4)$$

Given the boundary condition $v(0,t) = V_0 \cos(\omega_s t + \phi_s)$ at the source, a solution of Eq. (2) can be derived as follows:

$$v(z,t) = \quad (5\text{-}1)$$
$$V_s(z)\cos(\omega_s t - \beta_s z + \phi_s) + V_{m-s}(z)\sin(\omega_{m-s} t - \beta_{m-s} z + \phi_m - \phi_s) +$$
$$V_{m+s}(z)\sin(\omega_{m+s} t - \beta_{m+s} z + \phi_m + \phi_s).$$

The amplitudes at the three tones in Eq. (5-1) are functions of the propagation distance expressed as the following:

$$V_s(z) = V_0 \cos\left(\frac{1}{2\sqrt{2}}\xi\beta_s z\right), \quad (5\text{-}2)$$

$$V_{m-s}(z) = -\frac{V_0}{\sqrt{2}}\frac{\beta_{m-s}}{\beta_s}\sin\left(\frac{1}{2\sqrt{2}}\xi\beta_s z\right), \quad (5\text{-}3)$$

$$V_{m+s}(z) = -\frac{V_0}{\sqrt{2}}\frac{\beta_{m+s}}{\beta_s}\sin\left(\frac{1}{2\sqrt{2}}\xi\beta_s z\right), \text{ where} \quad (5\text{-}4)$$

$$\xi = C'_m/C'_0 \quad (5\text{-}5)$$

is defined as the capacitance modulation index. The solution represents a gradual conversion process of the signal and the carrier energy into that of the frequency-modulated signal. The magnitude of the signal reduces gradually while the magnitudes of the modulated tones increase along the transmission line until they reach to a distance of $z = \lambda_s/\xi\sqrt{2}$. The average powers at the three tones are $$P_s(z) = \frac{V_0^2}{2Z_0}\cos^2\left(\frac{1}{2\sqrt{2}}\xi\beta_s z\right), \quad (6\text{-}1)$$

$$P_{m-s}(z) = \frac{V_0^2}{4Z_0}\left(\frac{\beta_{m-s}}{\beta_s}\right)^2 \sin^2\left(\frac{1}{2\sqrt{2}}\xi\beta_s z\right), \quad (6\text{-}2)$$

$$\ldots \quad (6\text{-}3)$$

where $Z_0 = \sqrt{L'/C'_0}$ is the characteristic impedance of the transmission line. Given the input power of $P_{in} = V_0^2/2Z_0$, the power change of the signal at the fundamental tone $\omega_s$ is $P_s-P_{in}$, where the high gain characteristics of the degenerating parametric effects is exploited for development of parametric amplifiers or oscillators.

Comparatively, if the signal wave travels in the opposite direction to that of the carrier wave, no solution can be obtained from Eq. (2), implying no energy is coupled between the signal wave and the waves at the sidebands. The directional dependency of the parametric conversion can thus be used to develop non-reciprocal components. Such directional dependency is capable of separating the signals traveling in opposite directions into different frequency bands at the two ends of the transmission lines. The resulting non-reciprocity is intrinsically broadband as it is not based on resonance, such as in the manner of a conventional ferrite circulator. Using this directional dependency promises low loss and low noise characteristics as the structure only consists of reactance based components. The waves at the upconverted frequencies can attain equal or greater magnitude than that of the original signal wave, which occurs when a high carrier to signal frequency ratio ($\omega_m/\omega_s$) is used over a long time-varying transmission line.

The time-varying transmission line may be approached in practice by periodically loading a conventional transmission line with circuit elements providing variable capacitance, such as varactor diodes to form Distributedly Modulated Capacitor (DMC)

Figure 2:
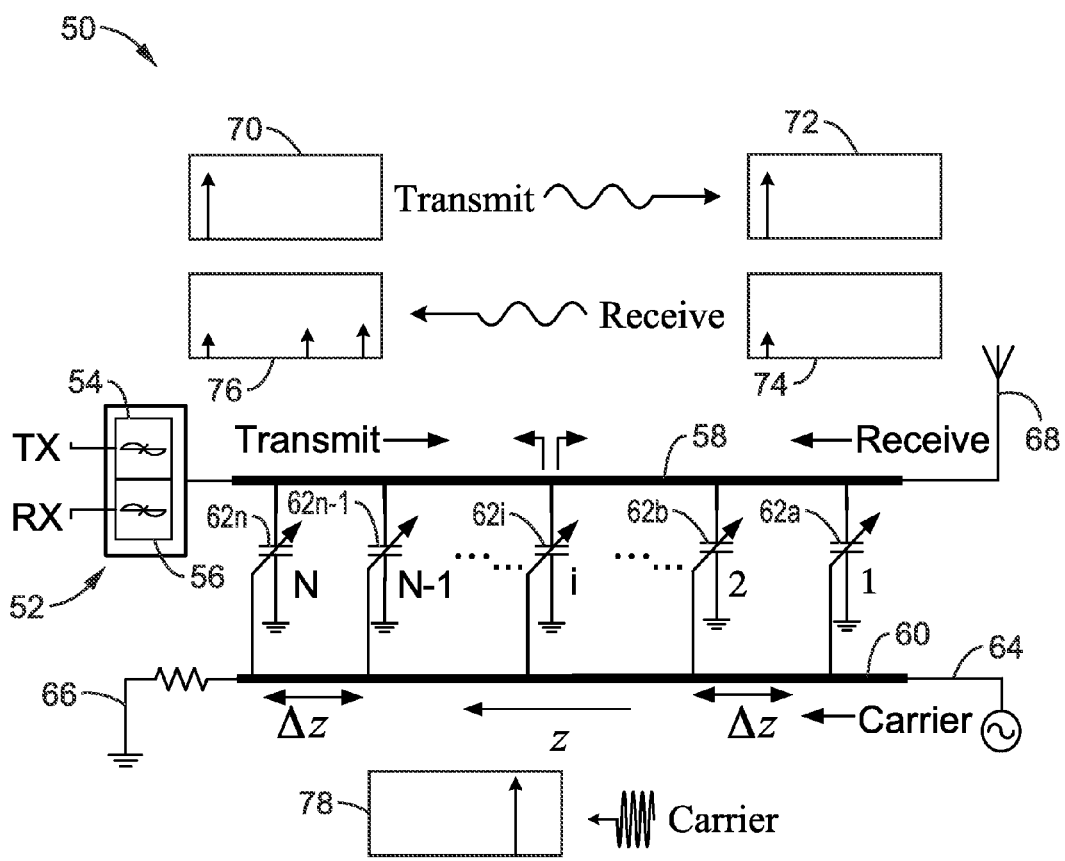
FIG. 2 is a block diagram of a distributed modulated capacitor (DMC) circuit having shunt circuit elements whose capacitance values are modulated by a carrier wave, according to an embodiment of the present disclosure.

FIG. 2 illustrates an example embodiment 50 of a proposed DMC circuit, which depicts a transmission line loaded with capacitors whose capacitances are modulated by a carrier wave that travels on the same or a different transmission line, yet having the same phase velocity as the signal wave.

In this figure a device 52 is shown with transmitter (TX) 54 and receiver (RX) 56 capability. A combination transmit-receive line (TRL) 58 is shown for transmitting and receiving in opposite directions, with a line 60 for a carrier traveling in a single direction. A plurality of variable capacitances 62a, 62b, through to 62i, and on through to 62n-1 and 62n are coupled between the transmission line 58 and ground 60. Carrier source 64 is attached to the lower line and properly terminated 66, such as to ground as shown. An antenna 68 is shown coupled to the signal line for simultaneous use by transmit circuit 54 and receive circuit 56.

Associated signals are seen in the figure with the transmit signal frequency composition seen at a first end 70 and a second end 72 of the transmission line, while a receive signal frequency composition is seen in the opposite direction from the second end 74, back to the first end 76. A carrier signal 78 is also seen at the bottom of the figure.

A DMC is a periodic structure, which is generally dispersive with its cutoff frequency defined by the loaded capacitance value and the density of the capacitor placement. The total electrical length of the DMC is selected to be at least half the transmission line wavelength at the lowest frequency requiring isolation and the interval between the two sets of loaded capacitors/varactor diodes is usually shorter than a quarter of the wavelength at the highest operating frequency including the frequencies of the original signal, carrier and upconverted signal. Limiting the length in this manner assures that the operating frequency is sufficiently below the cutoff frequency of the loaded transmission line so that the dispersion can be ignored. DMC bears almost all the features of a time-varying transmission line, including the property of up-converting the original signal to both sidebands of the carrier and the non-reciprocity in this upconversion process dictated by the traveling directions of the signal and the carrier waves. The dispersion of DMC, on the other hand, can be utilized to suppress the second harmonic of the carrier frequency, by designing the cutoff frequency below twice the carrier frequency toward preventing formation of shock wave in the carrier line.

In FIG. 2, the DMC is connected to an antenna 68 on its right-hand side and a transceiver 52 on its left-hand side. A carrier is injected from the right-hand side of the DMC. The antenna transmits and receives signals at the same frequency. The signal received by the antenna travels toward the transceiver, and this signal is upconverted by the carrier upon its arrival at the transceiver because it travels in the same phase velocity as the carrier. The transmitted signal, however, does not mix with the carrier because they have opposite phase velocity and the mixing terms cancel at any of the ports when added up. It remains at its original frequency all the way to the antenna. Therefore, the transmitted signal and the received signal are at different frequencies at the transceiver end of the DMC, and with a frequency diplexer they can now be separated into a transmitter port and a receiver port. The device illustrated in FIG. 2 plays the role of a circulator if the receiver operating frequency is modified accordingly. As previously mentioned, the non-reciprocity of the device is obtained by taking advantage of the additional dimension of the time-variance of the transmission line property.

The DMC on planar circuit boards or integrated circuits can be realized in a number of ways, including a single transmission line loaded with diodes, where the input signal, output signal and pumping carrier may be separated with frequency filters or diplexers, a pair of transmission lines loaded with diodes oriented in opposite directions, and pumping of the carrier in 180 degrees out of phase, a pair of transmission lines loaded with diodes oriented in the same directions and excited by input signal in 180 degrees out of phase.

Figure 3A:
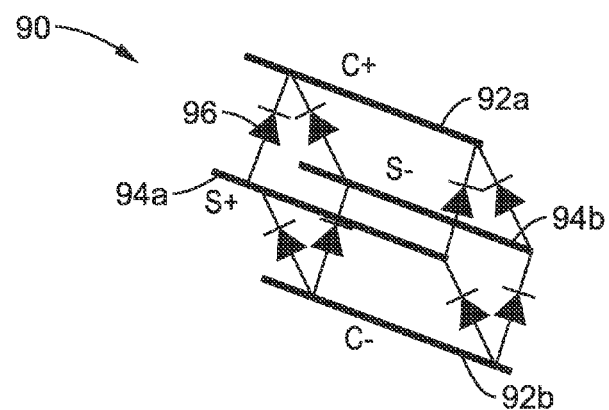
FIG. 3A and FIG. 3B are block diagrams of 4-line double balanced DMCs, according to embodiments of the present disclosure.

FIG. 3A illustrates an example embodiment 90 of a 4-line double balanced configuration of DMC. Lines are seen as carrier lines C+ 92a, C− 92b, and signal lines S+ 94a, and S− 94b, between which are coupled variable capacitance circuit elements, exemplified in the form of eight (8) varactor diodes 96 in a bridging configuration. It will be appreciated that the number of variable capacitance circuit elements can be extended beyond what is depicted in FIG. 3A, out to any practical length. The varactor diodes 96 interconnect between each of the signal lines for each unit cell along these lines. The cathode sides of the varactor diodes are oriented toward C+ 92a and S+ 94a respectively. The double balanced configuration depicted allows the cancellation of the capacitance modulation caused by the signal voltage and the construction of the capacitance modulation caused by the carrier voltage. The double balanced configuration achieves transmission line capacitance modulation solely in response to the carrier signal while maintaining signal linearity in transmitting and receiving.

Figure 3B:
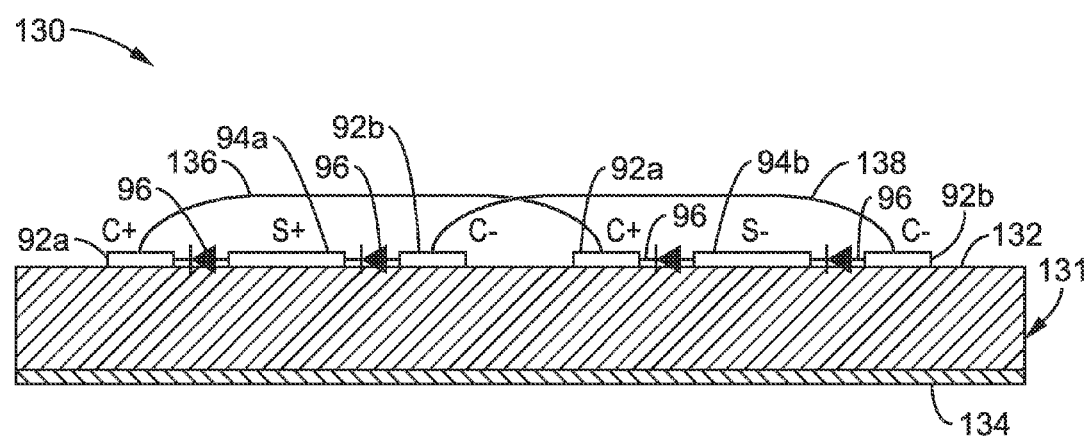

FIG. 3B illustrates an example embodiment 130 of a DMC, having the same double balanced transmission line as seen in FIG. 3A, but in this figure shown implemented on a microstrip line on a substrate 131 having an insulating layer 132 and bottom conductive layer 134.

In at least one preferred embodiment, this substrate comprises a microstrip line realization (shown here in cross-section). One can see that C+ 92a, and C− 92b lines are duplicated on each side of lines S+ 94a, and S− 94b which are interconnected between each unit cell with varactor diodes 96, as was seen in FIG. 3A. Bonding wires 136, 138, are seen interconnecting the two C+ lines 92a, and the two C– lines 92*b*. It should be appreciated that alternatively the S lines could be duplicated and placed on each side of the C lines. As this is a simple swapping of signals, no separate diagram is provided for this alternative embodiment. The theory behind DMC operation, such as exemplified but not limited to the disclosed embodiments, are discussed below.

However, the isolation offered by a uniformly modulated DMC follows a cardinal Sine function (SING function), which has a maximum isolation of 13 dB. Nonuniform modulations may offer a higher degree of isolation but are subject to a much more complicated implementation which reduces effective insertion gain of the device.

In contrast to the above, the technology described herein realizes deeper transceiver isolation without resorting to nonuniform capacitance modulation by using a balanced architecture.

Figure 4:
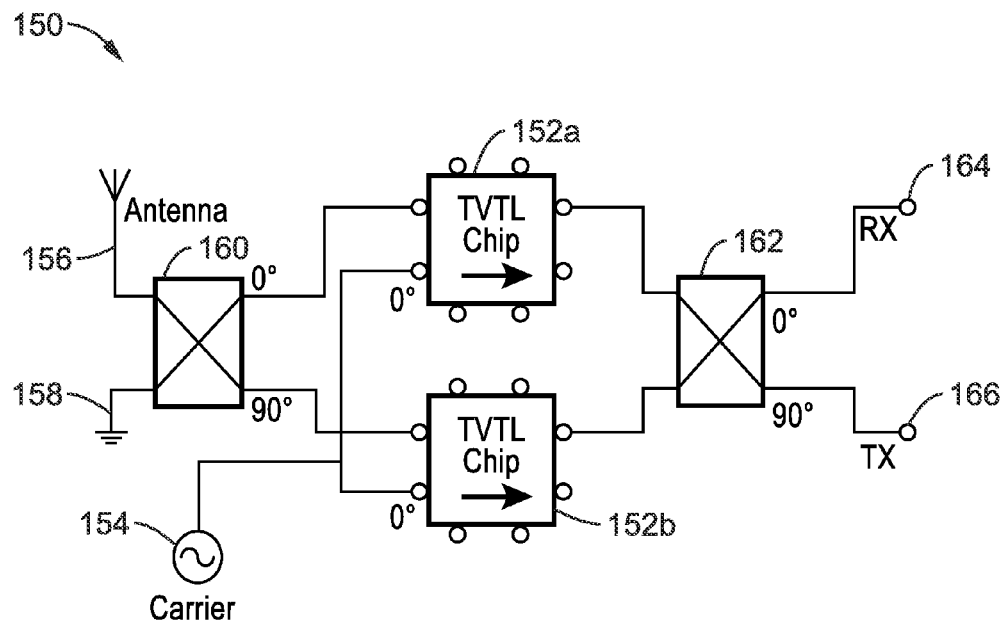
FIG. 4 and FIG. 5 are block diagrams of DMC circuits for separating the transmission line using time-varying transmission line (TVTL) chips according to an embodiment of the present disclosure.

FIG. 4 illustrates an example embodiment 150 separating the transmission lines, such as in a transceiver front end. In this example, two identical time-varying transmission lines (TVTLs) 164, 166 out to antenna 156 with ground 158, are realized. The circuit is shown with a first DMC in TVTL 152*a*, and a second DMC in TVTL 152*b*, which are each fed with the same carrier 154 with the same phase, while the received signal from the antenna 156 and ground 158 are routed to the two DMCs through a 90-degree coupler 160. The original received signal is combined at the lower arm of a second 90-degree coupler 162, because of the complementary phase difference between the two couplers, in connecting out a lower sideband to the receiver (RX) 164, and to the transmitter (TX) 166. For the same reason, the transmitted signal 166 injected into the second coupler will combine at the left upper corner of the first coupler 160 without loss.

When DMCs are utilized to generate a new received signal band at the lower sideband of the upconverted signal, the two branches of received signals now carry a flipped 90-degree phase difference and they will combine at the port exemplified here as the upper arm of the second coupler instead. On the other hand, the upconverted transmitted signal at the same lower sideband that are not completely suppressed by the DMC will combine at the port exemplified here as the lower arm of the second coupler. Therefore, the upconverted received signal and transmitted signal are physically separated into different ports, which achieves another level of isolation in addition to what is offered by a single DMC. In general, the phase diversity introduced between the two carrier paths fed into multiple DMCs or TVTLs can be manipulated to derive a deeper isolation over a broad bandwidth in addition to what is offered by a single DMC or TVTL, by making the transmitted signals cancel at the receiving port while the received signals add at the receiving port.

Figure 5:
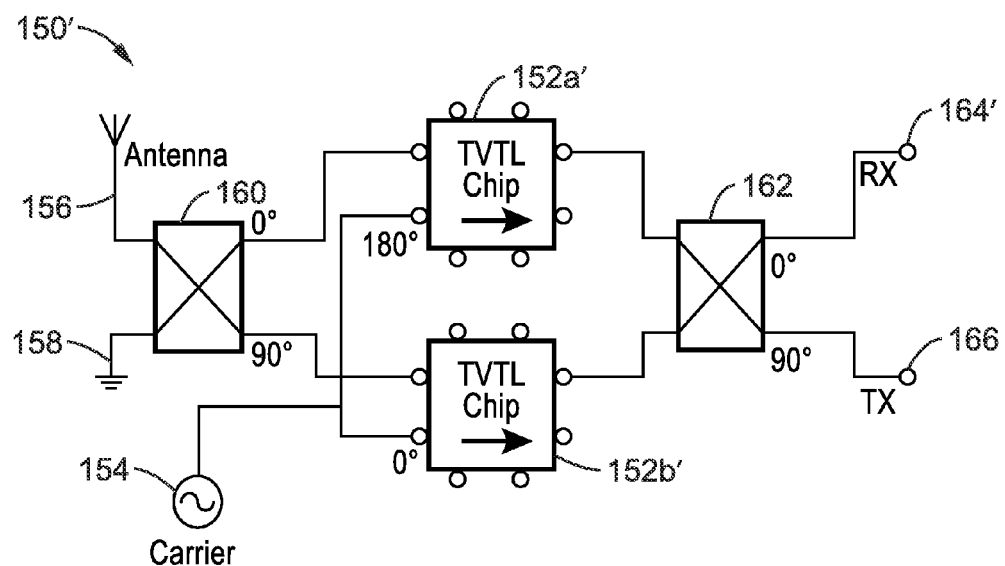

FIG. 5 illustrates an alternate example embodiment 150' in which the upper sideband of the upconverted signal is used as the received signal. Antenna 156 with ground 158 are shown connected to a first 90-degree coupler 160 as in the previous figure. The carrier 154 is now coupled to the two TVTL/DMC chips 152*a'*, 152*b'* that are in 180 degree phase. The 180 degree phase difference can be generated with a phase shifter, a longer delay line or differential outputs of the carrier source. The upper sideband of the upconverted received signal now combines at the port exemplified here as the upper arm of the second coupler 162 while the upconverted transmitted signal at the same upper sideband that are not completely suppressed by the DMC will combine at the port exemplified here as the lower arm of the second coupler 162. The circuit provides separation into different ports with a lower sideband to receiver (RX) 164', and to the transmitter (TX) 166'.

It should be appreciated that other configurations can be provided, including embodiments which modify the phase of the carrier to either 0 (zero) degrees or 180 degrees or any other desired phase to adapt the dispersion of the 90 degree couplers over different frequencies or sidebands.

Figure 6:
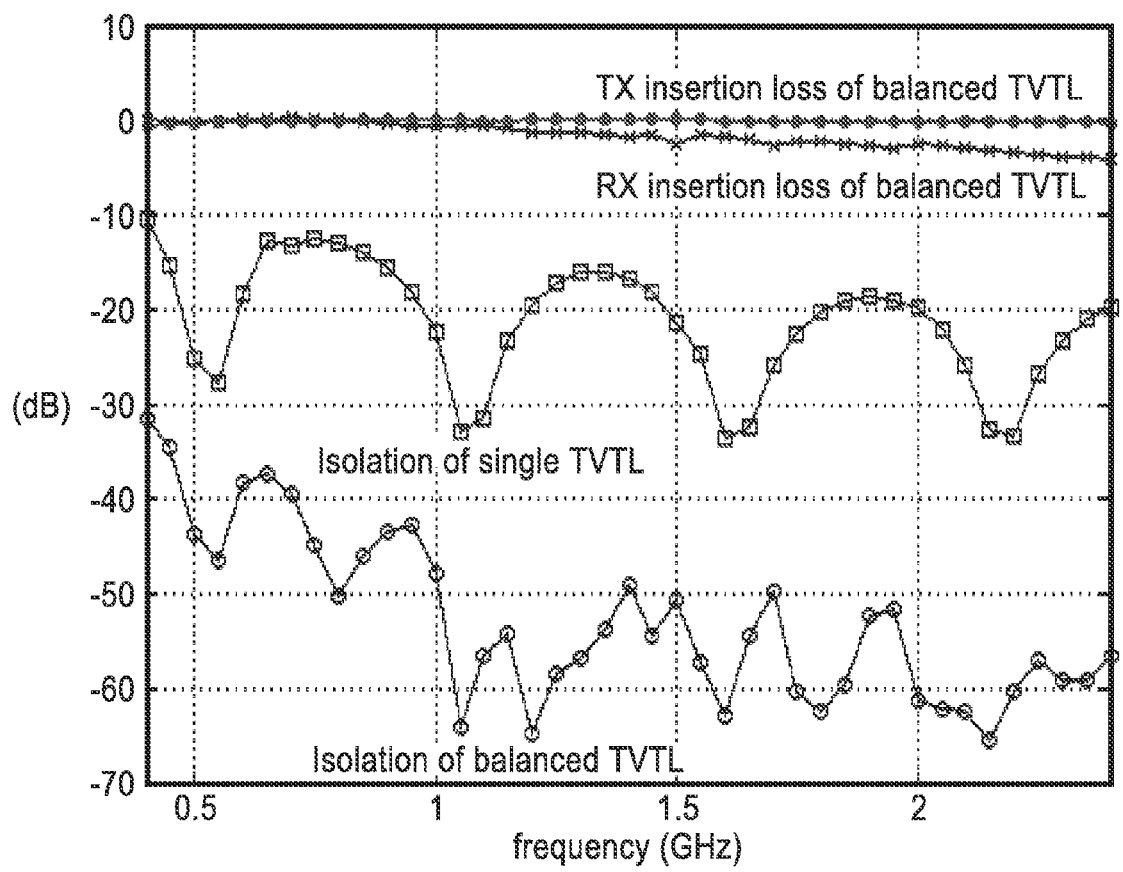
FIG. 6 is a plot of insertion loss for a balanced TVTL and a comparison of isolation levels for a single TVTL compared with a balanced TVTL according to an embodiment of the present disclosure.

FIG. 6 depicts a simulated isolation for a balanced TVTL/DMC, which by way of example and not limitation was designed for a 0.5 GHz to 2.5 GHz frequency range. An upper set of curves depicts insertion loss for a balanced TVTL in the top most plot. In the lower section of the plot is seen an isolation comparison between a single TVTL in the upper curve, with the isolation of a balanced TVTL according to the disclosure in the lower curve. It can be seen in the plot that a significantly increased level of isolation, greater than 30 dB, is observed for the frequencies of interest.

The technology of this disclosure is described in additional detail in the following sections which were attached as Appendix A and Appendix B in the provisional patent application from which this application claims the benefit of priority. It should be noted that no effort was made toward removing descriptive redundancies that existed in the original Appendices.

2. TVTL Pathway to Non-Reciprocal and Intelligent RF Front-Ends

Non-reciprocity is achieved with time-varying transmission line (TVTL) whose capacitance is modulated by a traveling wave carrier. Such a structure translates the difference in the propagating directions of the signals to the difference in modulation frequencies. By taking advantages of the low noise, broadband and frequency translation capability of TVTL, non-reciprocal RF front-ends capable of full-duplex communications can be constructed with a single antenna. Such front-ends pave the way for software defined radios as their operations are no longer subjected to the constraints of frequency diplexers.

2.1. Introduction.

Non-reciprocity in passive networks necessitate the usage of non-reciprocal material such as ferrite based magnetic material. The present disclosure describes exploiting the time-varying property of transmission line structures for an additional degree of freedom in designing non-reciprocal components. The time-variance of the transmission line is generated by the modulation of an unidirectionally propagating carrier. The signal propagating in the same direction with this carrier will mix with the carrier in frequency and the signal propagating against the direction of the carrier will not. Consequently, the difference in the propagating directions of signals is translated into the difference in modulation frequencies. It allows for separation of signals into different ports if a frequency diplexer is used. The frequency mixing behavior in the proposed time-varying transmission line is related to the distributed parametric conversion effects that were intensively studied between 1940's and 1960's.

The primary application at that time was to develop parametric amplifiers out of solid-state devices. The interest, however, diminished later when semiconductor transistors were invented and proven to be an overall better technology when amplifier gains and form factors were emphasized.

Parametric amplifiers, however, offer advantages of the intrinsically lower noise characteristics as they use reactance-based over conductance-based components. The time-varying transmission line considered here can be basically treated as a distributed parametric amplifier, where nondegenerating parametric conversion effects are either enhanced or suppressed with the distributed circuit architecture to create non-reciprocity over a broad frequency band.

2.2. Theory of Infinite TVTL

The theory of infinite transmission lines on which the reactance is time-varying are recaptured below to illustrate the underlying operating principle which was already generally seen and discussed in FIG. 1. The Telegrapher's equations are modified to include the time variation of the capacitance per unit length:

$$\frac{\partial v(z,t)}{\partial z} = -L'\frac{\partial I(z,t)}{\partial t} \quad (7\text{-}1)$$

$$\ldots \quad (7\text{-}2)$$

where L' and C' are inductance and capacitance per unit length. Rearranging the equations in Eq. (7) yields, $$\frac{\partial^2 v(z,t)}{\partial z^2} = L'\frac{\partial^2 C'(z,t)v(z,t)}{\partial t^2} = 0 \quad (8)$$

The capacitance is modulated by a carrier wave traveling in the +z direction at the angular frequency $\omega_m$ is given by $$C'(z,t)=C'_0+C'_m\cos(\omega_m t - \beta_m z + \phi_m) \quad (9)$$

where $C_0'$ is the mean capacitance per unit length, $C_m'$ is the amplitude of the capacitance variation per unit length, $\beta_m$ is the phase constant of the carrier. The carrier wave does not carry information and it behaves as a pumping signal drives the time-variation of the transmission line capacitance. On the other hand, a signal wave is launched into the same transmission line propagating toward the +z direction at the angular frequency $\omega_s$. The signal is mixed up and down with the capacitance modulation signal at the angular frequency $\omega_m$, generating various harmonic and intermodulation terms. As the modulation frequency is normally chosen to be greater than the signal frequency ($\omega_m > \omega_s$), one can limit the discussions to three major tones: the input tone $\omega_s$ and both sidebands of the carrier, $\omega_{m-s}=\omega_m-\omega_s$, and $\omega_{m+s}=\omega_m+\omega_s$.

Assuming the variation of the capacitance is small and the transmission line is non-dispersive over the bandwidth interested, particularly, $$\frac{\omega_s}{\beta_s} = \frac{\omega_{m-s}}{\beta_{m-s}} = \frac{\omega_{m+s}}{\beta_{m+s}} = \frac{\omega_m}{\beta_m} = v_p = \frac{1}{\sqrt{L'C_0'}} \quad (10)$$

a solution of Eq. (8) can be derived as follows, $$v(z,t) = \quad (11\text{-}1)$$
$$V_s(z)\cos(\omega_s t - \beta_s z + \phi_s) + V_{m-s}(z)\sin(\omega_{m-s}t - \beta_{m-s}z + \phi_m - \phi_s) +$$
$$V_{m+s}(z)\sin(\omega_{m+s}t - \beta_{m+s}z + \phi_m + \phi_s)$$

where, $$V_s(z) = V_0\cos\frac{1}{2\sqrt{2}}\xi\beta_s z \quad (11\text{-}2)$$

$$V_{mns}(z) = \frac{V_0}{\sqrt{2}}\frac{\beta_{mns}}{\beta_s}\sin\frac{1}{2\sqrt{2}}\xi\beta_s z \quad (11\text{-}3)$$

where $\xi=C'_m/C'_0$ is the so-called capacitance modulation index.

2.3. Non-Reciprocal RF Front-End with TVTL

TVTL can be approached with a transmission line periodically loaded with a bank of capacitors whose capacitance is modulated by a traveling carrier wave, as was shown already in FIG. 2. The use of so-called distributed modulated capacitors (DMC) is a strategy of implementing TVTL with varactor diodes in a planar fashion capable of integration. The TVTL shown in FIG. 2 upconverts the received signal to $\omega_{m-s}=\omega_m-\omega_s$, or $\omega_{m+s}=\omega_m+\omega_s$ while the transmitted signal remains at its original frequency.

Therefore a diplexer can be used to separate these two types of signals. A TVTL with finite length NΔz offers isolation between the received path and the transmitted path described by the following equation, $$\left|\frac{v_{transceiver}^{TX}}{v_{transceiver}^{RX}}\right| = \frac{\sin(N\omega_s\Delta z/v_p)}{N\sin(\omega_s\Delta z/v_p)}. \quad (12)$$

A broadband full-duplex RF front-end can thus be built with TVTL, assuming the isolation level described by Eq. (12), is sufficient, which is approximately 13 dB in worst case. If deeper isolation is desired in this configuration, then non-uniform weighting to the carrier modulation index could be applied.

2.4. Non-Reciprocal Front-End with Balanced TVTL

An alternative way of realizing deeper transceiver isolation without resorting to non-uniform capacitance modulation is to use a balanced architecture as was shown in FIG. 4. The upconverted received signal and transmitted signal are physically separated into different ports, which achieves another level of isolation in addition to what is offered by Eq. (12). A harmonic balance circuit simulation is performed to derive the insertion loss and isolation performance of a RF front-end with balanced TVTL. The carrier frequency is 6 GHz and the operating frequency is from 400 MHz to 2.4 GHz. In the example embodiment, each TVTL comprises 16 sets of varactor diodes used in forming the TVTL, with a 90 degree long transmission line at the carrier frequency between adjacent sets. By way of example a 90-degree Lange coupler with dual-bands respectively centered at 1.5 GHz and 4.5 GHz can be implemented on an alumina substrate. The simulated results seen previously in FIG. 6 demonstrated that approximately 30 dB more isolation can be achieved in addition to the original SING pattern isolation offered by a single TVTL.

3. DMCs for Non-Reciprocal Components 3.1. Background

It is well known that based on the reciprocity theorem, non-reciprocity cannot be realized in a lossless form if the component is made of only linear, passive, reciprocal material. Non-reciprocal microwave components, such as isolators and circulators, require the use of non-reciprocal material, for example ferrite magnetic material. These components, however, are often bulky, lossy and narrow band, particularly when they are operated at the lower end of the microwave frequency spectrum.

Separating a transmitting and receiving channel connected to a single antenna is currently realized with circulators which are often fabricated using non-reciprocal magnetic material, such as ferrite. They are not compatible with the standard integrated circuit process and can only provide acceptable performance over a relatively narrow band. Circulators based on optical links can offer broadband performance, however, they are physically bulky and cannot be integrated on-chip either. Active circulators based on transistor amplifiers have also been developed, but these devices add noise to the receiver, while the use of these active devices limits the maximum operating power of the transmitter.

Thus, a need exists for realizing non-reciprocal components without the limitation of previous techniques.

3.2. Introduction

A new technique is described for realizing non-reciprocal components, such as circulators, that can operate over a broad bandwidth. In these DMC circulators, a signal traveling in the same direction as that of the carrier wave will be modulated on the carrier while the signal that travels in the opposite direction will not. Accordingly, signals traveling in opposite directions on the same path (e.g., antenna or transmission line) can be readily separated.

DMC circulators of this disclosure can be manufactured with a standard integrated circuit process. Devices utilizing this technique provide a pathway toward creating integrated electronics which are capable of simultaneous transmitting and receiving through the same antenna, at the same time, and over the same frequency.

Circulators of the disclosure can be realized with standard single or multiple layer printed circuits without need for magnetic components or material. It can thus be integrated on the same chip with other electronic elements toward offering numerous advantages in reduced size and production cost. The apparatus can be designed to operate over a broad bandwidth, with minimal noise contribution to the receiver, and without significantly constraining transmit power.

In at least one embodiment, it is contemplated to meld these DMC circulators with state of the art integrated circuit technology, such as monolithic microwave integrated circuit (MMIC) or radio frequency integrated circuit (RFIC), with its applications to high-performance microwave and millimeter wave radio systems.

Commercial applications include, but are not limited to, compact radar systems, miniaturized radios such as cellphones and high performance RFID readers.

3.3. Description of Embodiments.

The present disclosure describes non-reciprocal components formed along a combination transmit-receive path which are loaded with time-varying capacitors. The time-variance of the transmission line property adds a new dimension to non-reciprocal component design for microwave applications and can potentially provide non-magnetic, broadband and lossless realization of isolators or circulators. One of the more significant advantages of this form of design is that the device can be made compatible with modern integrated circuit technology, which may lead to monolithic integration of the complete transceiver front-end that provides isolation between the transmitting and receiving path without resorting to a frequency or time diplexer. It will be recognized that the need for magnetic materials are not readily implemented on integrated circuits, due to their bulk, and the general lack of integrated circuit process technology for magnetic materials.

In FIG. 3A and FIG. 3B realization of the use of distributed modulated capacitors (DMC) was illustrated through a double balanced configuration of varactor diodes on which the carrier and the signal waves propagate on different, electrically isolated transmission lines (or paths), while the shunt capacitance of both transmission lines (or paths) is predominantly controlled by the carrier wave. It should be appreciated that a varactor diode, (also often referred to as a "varicap diode", "variable capacitance diode", "variable reactance diode" or "tuning diode"), is a form of diode presenting a capacitance which varies as a function of the voltage applied across its terminals.

Transmission Line Solutions with Time-Varying Capacitances.

Transmission lines whose reactance is time-varying are known to have interesting properties. One of the classical applications is the traveling wave parametric amplifiers which were studied in the late 1950's. The basic analysis for transmission lines with time-varying capacitance is derived as follows. Considering transmission line equations with time-varying capacitance:

$$\begin{cases} \frac{\partial V(z,t)}{\partial z} = -L\frac{\partial I(z,t)}{\partial t} \\ \frac{\partial I(z,t)}{\partial z} = -\frac{\partial [C(z,t)V(z,t)]}{\partial t} \end{cases} \quad (13)$$

V(z,t) and . . . represent, respectively, the voltage and current along the transmission line as a function of distance and time. L is the inductance per unit length of the transmission line, while C(z,t) is the capacitance per unit length of the transmission line which is also a function of distance and time due to the modulation. Rewriting the equations for voltage and current independently yields:

$$\frac{\partial^2 V(z,t)}{\partial z^2} - L\frac{\partial^2 [C(z,t)V(z,t)]}{\partial t^2} = 0 \quad (14)$$

The above equation being applicable when the capacitance is modulated by a single-tone carrier which is a wave traveling in the same direction as that of the original signal. The capacitance thus has the following form:

$$C(z,t) = C_0 + C_m \cos(\omega_m t - \beta_m z) \text{ where } \frac{\omega_m}{\beta_m} = \frac{1}{\sqrt{LC_0}}$$

Equation (14) now becomes:

$$\frac{\partial^2 V(z,t)}{\partial z^2} - LC_0\frac{\partial^2 V(z,t)}{\partial t^2} - LC_m\frac{\partial^2 [\cos(\omega_m t - \beta_m Z)V(z,t)]}{\partial t^2} = 0 \quad (15)$$

It is evident from Eq. (15) that a signal wave launched into this transmission line will be mixed up and down with the capacitance modulation frequency, which will generate many harmonic and intermodulation terms. One can limit the discussions to the three major terms only at the frequencies $\omega_s$, $\omega_{m-s}$, $\omega_{m+s}$, where subscript "s" represents the original signal frequency and "m" represents the modulation frequency. It will be noted that the modulation frequency is normally chosen to be significantly higher than the signal frequency. It is expected that the magnitudes of these terms vary in distance due to energy coupling and conversion while the waves propagate along the transmission line. It will be noted that the selection of carrier frequency (modulation frequency) is normally higher than the signal frequency to: (a) avoid the overlap of frequencies between the unconverted signal band and the original signal band, and (b) to achieve the higher conversion gain (lower loss). There is no absolute number for this ratio as it depends on the system bandwidth and gain requirement. In the prototype, the factor was 10 times that of the lowest signal frequency and approximately 2.5 times that of the highest signal frequency. Assuming the transmission line is non-dispersive over a broad bandwidth, one can easily prove that solutions exist for Eq. (15), as given by:

$$V(z, t) = V_s(z)\cos(\omega_s t - \beta_s z + \varphi_s) - $$
$$V_{m-s}(z)\sin(\omega_{m-s} t - \beta_{m-s} z + \varphi_s) - V_{m+s}(z)\sin(\omega_{m+s} t - \beta_{m+s} z + \varphi_s)$$

where:

$$\begin{cases} V_s(z) = V_0 \cos\left(\frac{1}{2\sqrt{2}} \xi_1 \beta_s z\right) \\ V_{m-s}(z) = \frac{V_0}{\sqrt{2}} \frac{\beta_{m-s}}{\beta_s} \sin\left(\frac{1}{2\sqrt{2}} \xi_1 \beta_s z\right) \\ V_{m+s}(z) = \frac{V_0}{\sqrt{2}} \frac{\beta_{m+s}}{\beta_s} \sin\left(\frac{1}{2\sqrt{2}} \xi_1 \beta_s z\right) \end{cases} \quad (16)$$

and $\xi_1 = \frac{C_m}{C_0}$.

It is evident from Eq. (16) that the transmission line with time-varying capacitance allows for coupling of the propagating modes at different frequencies in a lossless fashion when these modes are propagating in the same direction as the modulation signal. The total amount of energy, counting all the three tones, increases along the TVTL as the energy of the modulation signal is injected into the system through the capacitance modulation.

When the transmission line, or path, is sufficiently long, the "m−s" and "m+s" terms will eventually reach their maximum where they are amplified with the factors of $\beta_{m-s}/\beta$ and $\beta_{m+s}/\beta$ respectively. It should be appreciated that this gain of the TVTL is similar to that of the parametric amplifier. In theory, it does not introduce any noise into the system if the ohmic resistance of the varactors is ignored. In reality, the loss of the diodes will eventually accumulate to a certain degree so that a long TVTL is no longer practical even with high-Q varactor diodes. On the other hand, a signal wave traveling in the opposite direction of the modulation carrier does not interact with the capacitance modulation and the coupling among different modes will not arise. Based on these properties, lossless and non-reciprocal components with a small amount of gain can be potentially realized in this manner.

Circulator with Distributed Modulated Capacitors (DMC).

In FIG. 2 as previously described, a circulator is exemplified utilizing a bank of capacitors. The capacitance of each capacitor is shown being varied in response to the carrier signal on line 60. Transmission voltage is propagating in the −z direction, characterized by $T(z,t) = e^{j\omega_0(t+z/v_p)}$. The receiver voltage is propagating in −z direction, and is characterized by $R(z,t) = e^{j\omega_0(t-z/v_p)}$.

It will be recognized that ferrite circulators typically offer only about 13 dB of isolation over bandwidths smaller than one octave. The circulator of the presented technology uses a bank of capacitors whose capacitance is modulated with a carrier wave that travels in one direction. An intuitive analysis is provided as follows to show that a signal traveling in the same direction as that of the carrier wave will be modulated on the carrier while the signal that travels in the opposite direction will not. This separates signals traveling in opposite directions on the same path into different frequencies so that they can be separated with a frequency diplexer at the end.

In FIG. 2, it will be noted that a bank of N capacitors was distributed with equal delay $\Delta z$ between them. The capacitance of each capacitor in the bank is modulated by the carrier wave traveling in the positive Z direction in the lower transmission line (TRL). The carrier wave is represented by the function:

$$C(z, t) = e^{j\omega_c\left(t - \frac{z}{v_p}\right)} e^{-\alpha z} \quad (17)$$

which includes both phase delay along the line and a certain attenuation factor caused by the energy conversion and the propagation loss. The carrier wave mixes with the waves propagating on the upper TRL, generates modulated signal $b_i^{RX}(t)$ at the i-th capacitor propagating toward both ends of the upper TRL. When the received signal is incident from the right hand side as seen in the figure, then one of the sidebands in the modulated signal generated at the ith unit is:

$$b_i^{RX}(t) = R_i(t)c_i(t) \quad (18)$$
$$= e^{j\omega_0(t - i\Delta z/v_p)} e^{j\omega_c(t - i\Delta z/v_p)}$$
$$= e^{j(\omega_0 + \omega_c)(t - i\Delta z/v_p)} e^{i\alpha_c \Delta z}$$

The mixing gain is assumed to be unity for the above equation for simplicity as the conversion loss/gain is irrelevant to the directional isolation performance. The total modulated signal arriving at both ends is given respectively by:

$$b_{left}^{RX} = \sum_{i=1}^{N} b_i^{RX}[t - (N-i) \cdot \Delta z/v_p] \quad (19)$$
$$= \sum_{i=1}^{N} e^{j(\omega_0+\omega_c)(t - N\Delta z/v_p)} e^{-i\alpha_c \Delta z}$$
$$= e^{j(\omega_0+\omega_c)(t - N\Delta z/v_p)} g \sum_{i=1}^{N} e^{-i\alpha_c \Delta z}$$

$$b_{right}^{RX} = \sum_{i=1}^{N} b_i^{RX}(t - i \cdot \Delta z/v_p) \quad (20)$$
$$= \sum_{i=1}^{N} e^{j(\omega_0+\omega_c)(t - 2i\Delta z/v_p)}$$
$$= e^{j(\omega_0+\omega_c)t} \sum_{i=1}^{N} e^{-j2i\cdot(\omega_0+\omega_c)/v_p \Delta z} e^{-i\cdot\alpha_c\Delta z} \to 0$$

Eq. (19) means the received signal arrives at the left end in its maximum amplitude while Eq. (20) shows good matching (e.g., a high level of matching, such as a return loss of beyond 10 dB) for the modulated received signal.

When the transmitted signal is injected from the left hand side, the associated modulated signal at the i-th unit is:

$$b_i^{TX}(t) = T_i(t)c_i(t) = e^{j\omega_0[t-(N-i)\cdot\Delta z/v_p]} e^{j\omega_c(t-i\cdot\Delta z/v_p)} e^{-i\alpha\Delta z} \quad (21)$$
$$= e^{j[(\omega_0+\omega_c)t - \omega_0(N-i)\Delta z/v_p - \omega_c i\cdot\Delta z/v_p]} e^{-i\alpha\Delta z}.$$

The total modulated signal arriving at both ends in this case is, $$b_{left}^{TX} = \sum_{i=1}^{N} b_i^{TX}[t-(N-i)\cdot \Delta z/v_p] \qquad (22)$$

$$= \sum_{i=1}^{N} e^{j[(\omega_0+\omega_c)t-\omega_0\cdot 2(N-i)\cdot \Delta z/v_p-\omega_c N\cdot \Delta z/v_p]} e^{-i\alpha_c \Delta z}$$

$$= e^{j[(\omega_0+\omega_c)t-\omega_c N\cdot \Delta z/v_p]} \sum_{i=1}^{N} e^{-j2(N-i)\omega_0 \Delta z/v_p} e^{-i\alpha_c \Delta z} \to 0$$

$$b_{right}^{TX} = \sum_{i=1}^{N} b_i^{TX}[t-i\cdot \Delta z/v_p] \qquad (23)$$

$$= \sum_{i=1}^{N} e^{j[(\omega_0+\omega_c)t-\omega_0\cdot N\cdot \Delta z/v_p-\omega_c 2i\cdot \Delta z/v_p]} e^{-i\alpha_c \Delta z}$$

$$= e^{j[(\omega_0+\omega_c)t-\omega_0 N\cdot \Delta z/v_p]} \sum_{i=1}^{N} e^{-j2i\omega_c \Delta z/v_p} e^{-i\alpha_c \Delta z} \to 0$$

Eqs. (22) and (23) show that the modulation of the transmitted signal on top of the carrier is suppressed in both ends of the transmission line, which indicates that the transmitting signal will pass directly to the antenna with minimum interaction of the DMC. The isolation at the front-end is thus given by:

$$b_{left}^{TX}/b_{left}^{RX} = \frac{1-e^{-N\alpha \Delta z}}{1-e^{-\alpha \Delta z}} \frac{1-e^{-N(\alpha_c+j2\beta_0)\Delta z}}{1-e^{-(\alpha_c+j2\beta_0)\Delta z}}. \qquad (24)$$

When the loss for the carrier wave is negligible, (24) becomes, $$b_{left}^{TX}/b_{left}^{RX} = \frac{\sin(N\beta_0 \Delta z)}{N\sin(\beta_0 \Delta z)}. \qquad (25)$$

It is evident from Eq. (25) that the isolation provided by DMC emulates that of sidelobe suppressions in phased arrays. Therefore, the isolation versus frequency performance can be shaped like the radiation of the phased array. Increased levels of isolation can be achieved with a non-uniform distribution of capacitor modulation coefficients.

In addition, for the DMC circulator, transmitting insertion loss (IL) should be zero because no coupling occurs. Receiver insertion loss is given by the parametric conversion gain derived as based on effective medium theory:

$$\frac{V_{c-s}(z)}{V_0} = \frac{1}{\sqrt{2}} \frac{f_c-f_s}{f_s} \sin\left(\frac{1}{2\sqrt{2}} \xi \beta_0 N \Delta z\right),$$

wherein $\xi$ is the capacitance variation ratio in each unit cell. Value $V_{c-s}$ (z) represents the voltage of the upconverted received signal, $V_0$ is the voltage of the original received signal, $f_c$ is the carrier frequency, and $f_s$ is the signal frequency.

Figure 7:
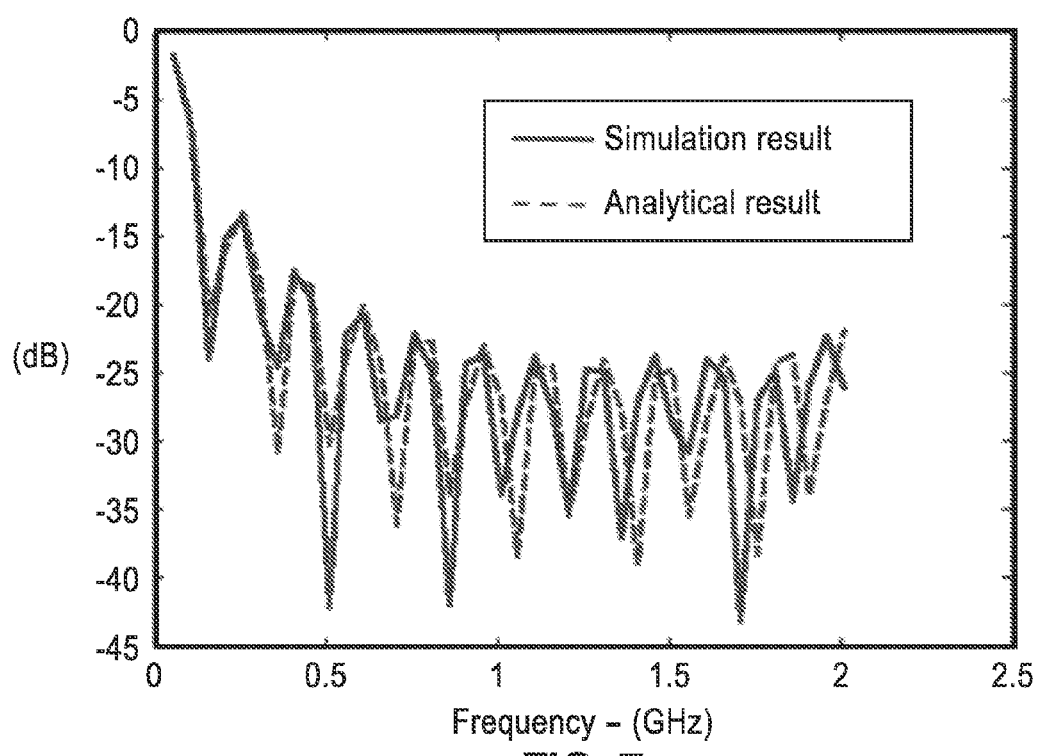
FIG. 7 is a plot comparing simulated and analytical leakage results for the DMC of FIG. 2, utilized according to an embodiment of the present disclosure.

FIG. 7 depicts a leakage comparison between simulated and analytical DMC results according to the present disclosure, on a DMC made of 16 capacitors on a transmission line with a total length of 2-wavelengths at 0.7 GHz. By way of example the simulation was an Agilent ADS simulation which provides non-linear circuit simulations based on harmonic balance analysis. The simulation is based on non-linear capacitors instead of modulated capacitors for its simplicity while these two cases are equivalent when the signal power is much lower than the carrier power. The prediction of the leakage agrees well with that of the theory except at higher frequencies. This is because the modification of the phase velocity due to the periodical capacitance loading has not been considered when Eq. (25) is applied.

Figure 8:
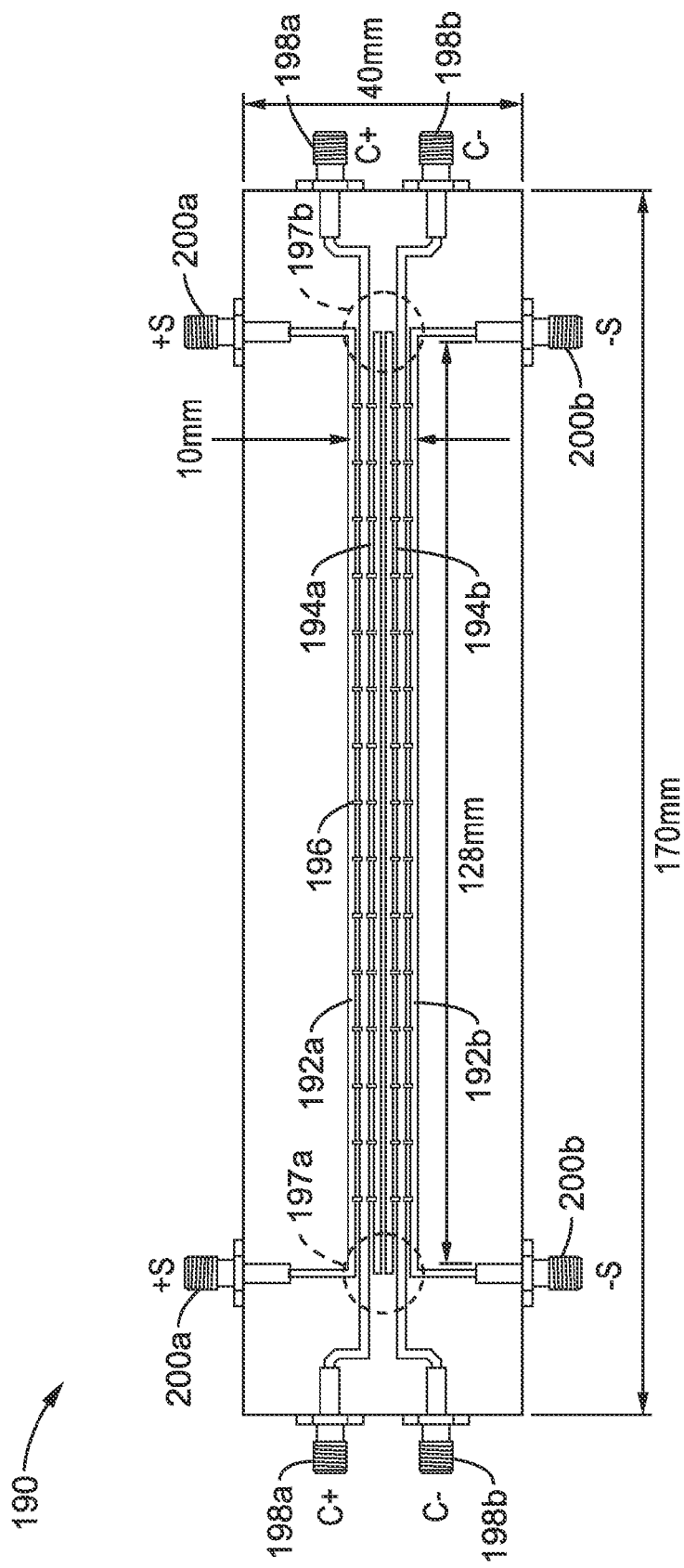
FIG. 8 is an image rendition of an implemented distributed modulated capacitor (DMC) circulator according to an embodiment of the present disclosure.

FIG. 8 depicts (as a rendition of a photographic image) an example embodiment 190 of a DMC implementation through a double balanced configuration of varactor diodes, as was exemplified in the schematic of FIG. 1. In FIG. 8 one can see the signal lines S+ 192a, S− 192b, and carrier line C+ 194a, C− 194b. This example comprises 16 unit cells, each of which has four varactor diodes 196 seen as little rectangular surface mount packages interconnected between the traces. Structures at locations 197a and 197b at each end of the lines are to be configured for providing cross-overs of the transmission lines. The cross over positions are merely indicated with the dashed line circles to allow seeing the underlying traces. External connections are depicted on each end with carrier C+ 198a, C− 198b, and on the sides with signal +S 200a, −S 200b. The implemented device is seen with a board length of 170 mm, with a width of 40 mm. The actual TRL and carrier lines on that board are seen at 128 mm in length, with a width of 10 mm. It will be appreciated that the sizing shown above is by way of example for this configuration and frequency, and not by way of limitation. By way of example and not limitation this embodiment was fabricated on Roger Duroid substrate with dielectric constant of 3.55 and a thickness of 32 mils.

Figure 9:
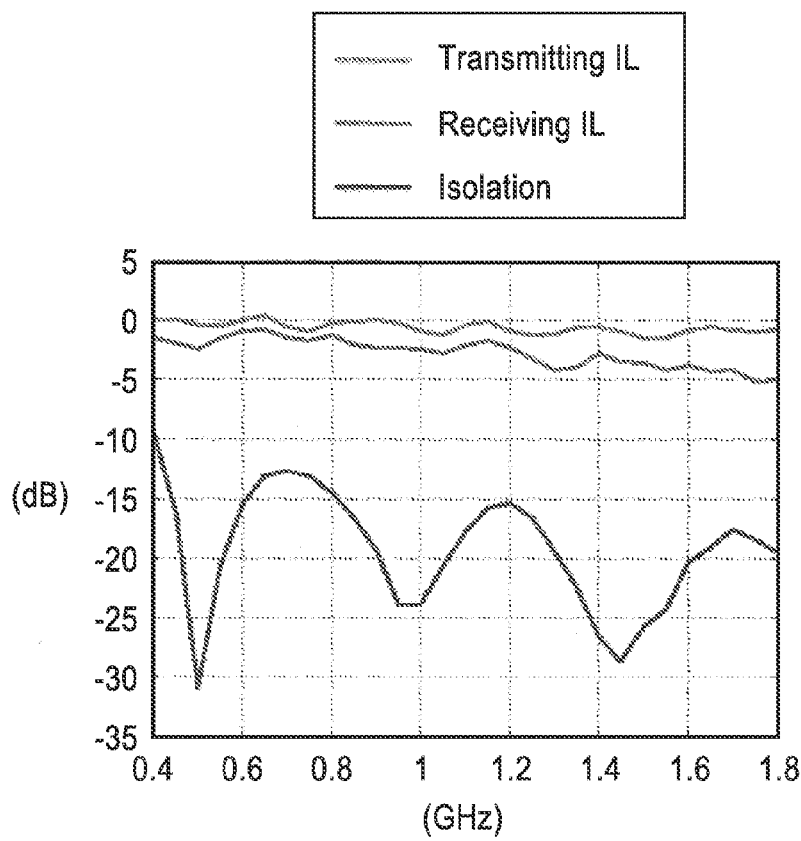
FIG. 9 is a plot of measured insertion loss and transmitter/receiver isolation for the DMC circulator of FIG. 8, utilized according to an embodiment of the present disclosure.

FIG. 9 depicts measured performance of the DMC seen in FIG. 8, showing insertion loss (IL) for transmitting and receiving, as well as showing the isolation levels between the transmitter and receiver whose signals are utilizing the same path in different directions. In this example, the transmitter IL is from the transmitter to the antenna at the original frequency. The receiver IL is from the antenna to the receiver at the upconverted frequency. The insertion loss levels are seen as ranging between 0 and about 5 dB across the bandwidth. The isolation level is between the transmitter and receiver at the upconverted frequency, and is seen exceeding 10 dB across up to 30 dB across the bandwidth.

Figure 10:
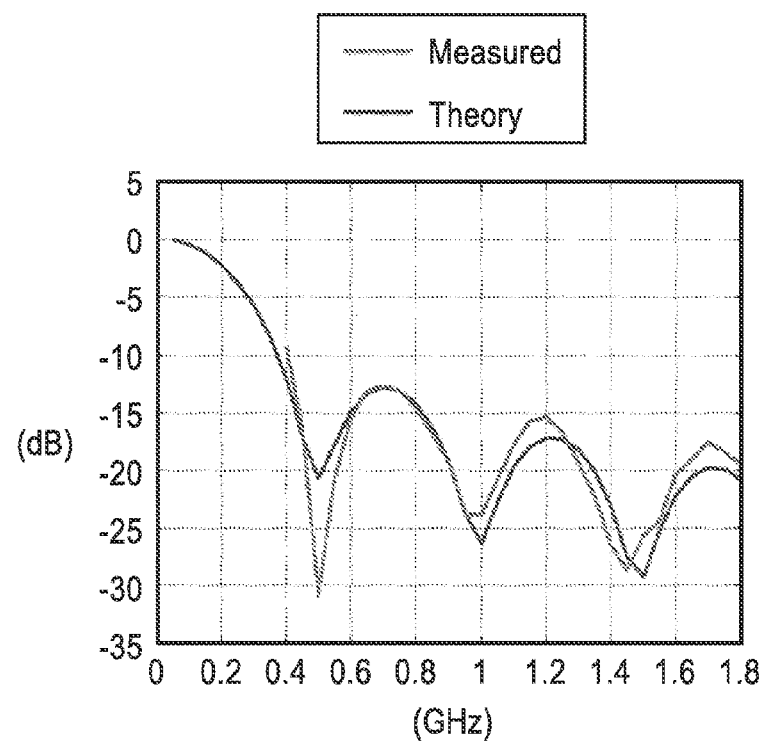
FIG. 10 is a plot comparing theoretical and measured levels of TX-RX isolation for the DMC circulator of FIG. 8, utilized according to an embodiment of the present disclosure.

FIG. 10 depicts a comparison between measured TX-RX isolation and that given by the theory. It can be seen from the plot that the measured results are in close accord with the theoretical values.

Figure 11:
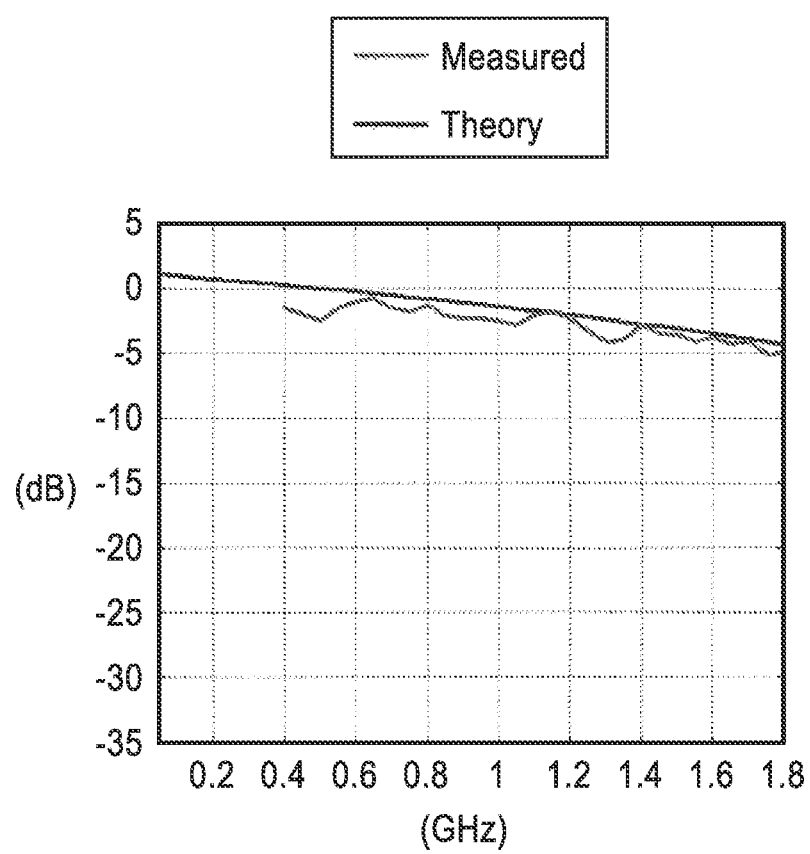
FIG. 11 is a plot comparing theoretical and measured levels of receiver insertion loss (IL) for the DMC circulator of FIG. 8, utilized according to an embodiment of the present disclosure.

FIG. 11 depicts a comparison between measured receiving insertion loss (IL) and that given by theory. It can be seen here as well, that the measured results are in accord with the theoretical values.

From the discussion above, it should be appreciated that DMC technology can potentially replace ferrite based circulators in future applications due to its compactness, broad bandwidth and compatibility to MMIC, and other state of the art processing. The technology can potentially be implemented for RF front ends requiring simultaneous transmitting and receiving (STAR) at the same frequency band and the same time. In addition, the measured results with a hybrid circuit validated the theory while still offering significant performance benefits.

From the description herein, it will be appreciated that the present disclosure encompasses multiple embodiments which include, but are not limited to, the following:

1. A non-reciprocal radio frequency transceiver front end apparatus, comprising: at least two time-varying transmission lines (TVTLs) connected between first and second 90 degree couplers in a balanced structure, with said first 90 degree coupler connected to antenna side ports, and said second 90 degree coupler connected to a transmitter port and a receiver port; wherein each of said TVTLs have first and second inputs and an output, and said TVTLs comprise distributed modulated capacitors (DMC) that perform upconversion in frequency, having upper and lower sidebands, in response to high frequency pumping from a carrier source; wherein the combination of said TVTLs and said couplers physically separate an upconverted received signal and transmitted signal into different ports for canceling upconverted transmitted signals at the receiver port while adding upconverted received signals at the receiver port so that a transmitter and receiver can share an antenna.

2. A non-reciprocal radio frequency transceiver front end apparatus, comprising: at least a first and second time-varying transmission line (TVTL) providing two TVTL paths, each TVTL having first and second inputs and an output; wherein each TVTL comprises a transmission line of distributed modulated capacitors (DMC); wherein said second input is configured for connection to receive the radio frequency signal and the first input of each TVTL is configured for connection to a carrier source that provides a high frequency pumping signal to the TVTL for upconversion in frequency; a first 90 degree coupler having a zero degree phase shifted output coupled to said second input of said first TVTL, and a 90 degree phase shifted output coupled to said second input of said second TVTL; wherein said first 90 degree coupler is configured with an antenna input; and a second 90 degree coupler having a first input connected to the output of said first TVTL, and a second input connected to output of said second TVTL; wherein said second 90 degree coupler generates a zero degree phase shift for connection to a receive port, and a 90 degree phase shift for connection to a transmit port; and wherein an upconverted received signal and transmitted signal are physically separated into different ports, so that transmitted signals cancel at said receive port while the received signals add at the receive port to provide another level of isolation beyond that available in a single DMC, while simultaneously operating a transmitter and receiver sharing an antenna.

3. The apparatus of any preceding embodiment, wherein said distributed modulated capacitors (DMC) exploit time-varying properties of transmission line structures to isolate the transmit and receive signals.

4. The apparatus of any preceding embodiment, wherein said distributed modulated capacitors (DMCs) comprise a bank of variable capacitance elements that are distributed with equal delay between adjacent variable capacitance elements.

5. The apparatus of any preceding embodiment, wherein capacitance in said DMCs is modulated by a carrier wave acting as a pump signal, wherein aside from controlling capacitance said carrier wave does not otherwise carry information.

6. The apparatus of any preceding embodiment, wherein said apparatus utilizes directional dependency for separating signals traveling in opposite directions in said TVTLs into different frequency bands at the two ends of the transmission lines within said TVTLs.

7. The apparatus of any preceding embodiment, wherein said apparatus provides a balanced structure comprising paired 90 degree couplers and TVTLs.

8. The apparatus of any preceding embodiment, wherein said apparatus is fabricated utilizing integrated circuit technology.

9. The apparatus of any preceding embodiment, wherein said apparatus is fabricated utilizing integrated circuit technology comprising either Monolithic Microwave Integrated Circuit (MMIC) or Radio Frequency Integrated Circuit (RFIC).

10. The apparatus of any preceding embodiment, wherein said apparatus comprises a front end for a radio system selected from the group of radio systems consisting of compact radar systems, miniaturized radios, cell phones, and high performance RFID readers.

11. A non-reciprocal radio frequency transceiver front end apparatus, comprising: at least a first and second time-varying transmission line (TVTL) providing two TVTL paths, each TVTL having first and second inputs and an output; wherein said second input is configured for connection to receive the radio frequency signal and the first input of each TVTL is configured for connection to a carrier source that provides a high frequency pumping signal to the TVTL for upconversion in frequency; a first 90 degree coupler having a zero degree phase shifted output coupled to said second input of said first TVTL, and a 90 degree phase shifted output coupled to said second input of said second TVTL; wherein said first 90 degree coupler is configured with an antenna input; and a second 90 degree coupler having a first input connected to the output of said first TVTL, and a second input connected to output of said second TVTL; wherein said second 90 degree coupler generates a zero degree phase shift for connection to a receive port, and a 90 degree phase shift for connection to a transmit port; wherein said radio frequency signal received from the antenna is connected to said first 90 degree coupler, distributed over the two TVTL paths with 90 degree phase shift and upconverted in frequency, and coupled to said second 90 degree coupler that generates a negative 90 degree phase difference between the two paths, combined at the receiver port with zero phase difference; and wherein said transmit port outputs the transmit radio frequency signal to the second 90 degree coupler, distributed over the two TVTL paths with 90 degree phase, having a first component which remains at the same frequency coupled to the first 90 degree coupler that generates a negative 90 degree phase difference between the two paths that are combined at the antenna port with zero phase difference, and a second component of the transmit radio frequency signal which is upconverted in frequency coupled back to the second 90 degree coupler that generates a second 90 degree phase difference between the two paths which are cancelled at the receive port with 180 degree phase difference.

12. The apparatus of any preceding embodiment, wherein said apparatus allows simultaneously operating a transmitter and receiver sharing an antenna.

13. The apparatus of any preceding embodiment, wherein said
TVTL is implemented using distributed modulated capacitors (DMC).

14. The apparatus of any preceding embodiment, wherein said distributed modulated capacitors (DMC) exploit time-varying properties of transmission line structures to isolate the transmit and receive signals.

15. The apparatus of any preceding embodiment, wherein said distributed modulated capacitors (DMCs) comprise a bank of variable capacitance elements that are distributed with equal delay between adjacent variable capacitance elements.

16. The apparatus of any preceding embodiment, wherein capacitance in said DMCs is modulated by a carrier wave acting as a pump signal, wherein aside from controlling capacitance said carrier wave does not otherwise carry information.

17. The apparatus of any preceding embodiment, wherein said distributed modulated capacitors (DMCs) of a TVTL are fabricated on single or multiple layer printed circuits.

18. The apparatus of any preceding embodiment, wherein said apparatus utilizes directional dependency for separating signals traveling in opposite directions in said TVTLs into different frequency bands at the two ends of the transmission lines within said TVTLs.

19. The apparatus of any preceding embodiment, wherein said apparatus provides a balanced structure comprising paired 90 degree couplers and TVTLs.

20. The apparatus of any preceding embodiment, wherein said apparatus is fabricated utilizing integrated circuit technology.

21. The apparatus of any preceding embodiment, wherein said apparatus is fabricated utilizing integrated circuit technology comprising either Monolithic Microwave Integrated Circuit (MMIC) or Radio Frequency Integrated Circuit (RFIC).

22. The apparatus of any preceding embodiment, wherein said apparatus comprises a front end for a radio system selected from the group of radio systems consisting of compact radar systems, miniaturized radios, cell phones, and high performance RFID readers.

23. A method of simultaneously operating a transmitter and receiver that are sharing an antenna in a non-reciprocal radio frequency transceiver front end, comprising the steps of: coupling at least two time-varying transmission lines (TVTLs) between 90 degree couplers in a balanced structure with at least a first 90 degree coupler connected to antenna side ports, and a second 90 degree coupler connected to a transmitter port and a receiver port; performing high frequency pumping of distributed modulated capacitors (DMC) in each TVTL creating an upconversion in frequency, having upper and lower sidebands, in response to receipt of a carrier source; and physically separating an upconverted received signal and transmitted signal into different ports for canceling upconverted transmitted signals at the receiver port while adding upconverted received signals at the receiver port.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

In the claims, reference to an element in the singular is not intended to mean "one and only one" unless explicitly so stated, but rather "one or more." All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. A non-reciprocal radio frequency transceiver front end apparatus, comprising:

at least a first and second time-varying transmission line (TVTL) providing two TVTL paths, each TVTL having first and second inputs and an output;

wherein each TVTL comprises a transmission line of distributed modulated capacitors (DMC);

wherein said second input is configured for connection to receive a radio frequency signal and the first input of each TVTL is configured for connection to a carrier source that provides a high frequency pumping signal to the TVTL for upconversion in frequency;

a first 90 degree coupler having a zero degree phase shifted output coupled to said second input of said first TVTL, and a 90 degree phase shifted output coupled to said second input of said second TVTL;

wherein said first 90 degree coupler is configured with an antenna input; and a second 90 degree coupler having a first input connected to the output of said first TVTL, and a second input connected to output of said second TVTL;

wherein said second 90 degree coupler generates a zero degree phase shift for connection to a receive port, and a 90 degree phase shift for connection to a transmit port; and wherein an upconverted received signal and transmitted signal are physically separated into different ports, so that transmitted signals cancel at said receive port while the received signals add at the receive port to provide another level of isolation beyond that available in a single DMC, while simultaneously operating a transmitter and receiver sharing an antenna.

2. The apparatus as recited in claim 1, wherein said distributed modulated capacitors (DMC) exploit time-varying properties of transmission line structures to isolate the transmit and receive signals.

3. The apparatus as recited in claim 1, wherein said distributed modulated capacitors (DMCs) comprise a bank of variable capacitance elements that are distributed with equal delay between adjacent variable capacitance elements.

4. The apparatus as recited in claim 3, wherein capacitance in said DMCs is modulated by a carrier wave acting as a pump signal, wherein aside from controlling capacitance said carrier wave does not otherwise carry information.

5. The apparatus as recited in claim 1, wherein said apparatus utilizes directional dependency for separating signals traveling in opposite directions in said TVTLs into different frequency bands at the two ends of the transmission lines within said TVTLs.

6. The apparatus as recited in claim 1, wherein said apparatus provides a balanced structure comprising paired 90 degree couplers and TVTLs.

7. The apparatus as recited in claim 1, wherein said apparatus is fabricated utilizing integrated circuit technology.

8. The apparatus as recited in claim 1, wherein said apparatus is fabricated utilizing integrated circuit technology comprising either Monolithic Microwave Integrated Circuit (MMIC) or Radio Frequency Integrated Circuit (RFIC).

9. The apparatus as recited in claim 1, wherein said apparatus comprises a front end for a radio system selected from the group of radio systems consisting of compact radar systems, miniaturized radios, cell phones, and high performance RFID readers.

10. A non-reciprocal radio frequency transceiver front end apparatus, comprising:

at least a first and second time-varying transmission line (TVTL) providing two TVTL paths, each TVTL having first and second inputs and an output;

wherein said second input is configured for connection to receive a radio frequency signal and the first input of each TVTL is configured for connection to a carrier source that provides a high frequency pumping signal to the TVTL for upconversion in frequency;

a first 90 degree coupler having a zero degree phase shifted output coupled to said second input of said first TVTL, and a 90 degree phase shifted output coupled to said second input of said second TVTL;

wherein said first 90 degree coupler is configured with an antenna input; and a second 90 degree coupler having a first input connected to the output of said first TVTL, and a second input connected to output of said second TVTL;

wherein said second 90 degree coupler generates a zero degree phase shift for connection to a receive port, and a 90 degree phase shift for connection to a transmit port;

wherein said radio frequency signal received from the antenna is connected to said first 90 degree coupler, distributed over the two TVTL paths with 90 degree phase shift and upconverted in frequency, and coupled to said second 90 degree coupler that generates a negative 90 degree phase difference between the two paths, combined at the receiver port with zero phase difference; and wherein said transmit port outputs the transmit radio frequency signal to the second 90 degree coupler, distributed over the two TVTL paths with 90 degree phase, having a first component which remains at the same frequency coupled to the first 90 degree coupler that generates a negative 90 degree phase difference between the two paths that are combined at the antenna port with zero phase difference, and a second component of the transmit radio frequency signal which is upconverted in frequency coupled back to the second 90 degree coupler that generates a second 90 degree phase difference between the two paths which are cancelled at the receive port with 180 degree phase difference.

11. The apparatus as recited in claim 10, wherein said apparatus allows simultaneously operating a transmitter and receiver sharing an antenna.

12. The apparatus as recited in claim 10, wherein said TVTL is implemented using distributed modulated capacitors (DMC).

13. The apparatus as recited in claim 12, wherein said distributed modulated capacitors (DMC) exploit time-varying properties of transmission line structures to isolate the transmit and receive signals.

14. The apparatus as recited in claim 13, wherein said distributed modulated capacitors (DMCs) comprise a bank of variable capacitance elements that are distributed with equal delay between adjacent variable capacitance elements.

15. The apparatus as recited in claim 12, wherein capacitance in said DMCs is modulated by a carrier wave acting as a pump signal, wherein aside from controlling capacitance said carrier wave does not otherwise carry information.

16. The apparatus as recited in claim 12, wherein said distributed modulated capacitors (DMCs) of a TVTL are fabricated on single or multiple layer printed circuits.

17. The apparatus as recited in claim 12, wherein said apparatus utilizes directional dependency for separating signals traveling in opposite directions in said TVTLs into different frequency bands at the two ends of the transmission lines within said TVTLs.

18. The apparatus as recited in claim 12, wherein said apparatus provides a balanced structure comprising paired 90 degree couplers and TVTLs.

19. The apparatus as recited in claim 12, wherein said apparatus is fabricated utilizing integrated circuit technology.

20. The apparatus as recited in claim 12, wherein said apparatus is fabricated utilizing integrated circuit technology comprising either Monolithic Microwave Integrated Circuit (MMIC) or Radio Frequency Integrated Circuit (RFIC).

21. The apparatus as recited in claim 12, wherein said apparatus comprises a front end for a radio system selected from the group of radio systems consisting of compact radar systems, miniaturized radios, cell phones, and high performance RFID readers.

* * * * *